July 30, 1957 P. B. FEDERBUSH ET AL 2,801,115
DISPLAY PANELS FOR CATALOG BINDERS AND THE LIKE
Filed Dec. 6, 1954 3 Sheets-Sheet 1
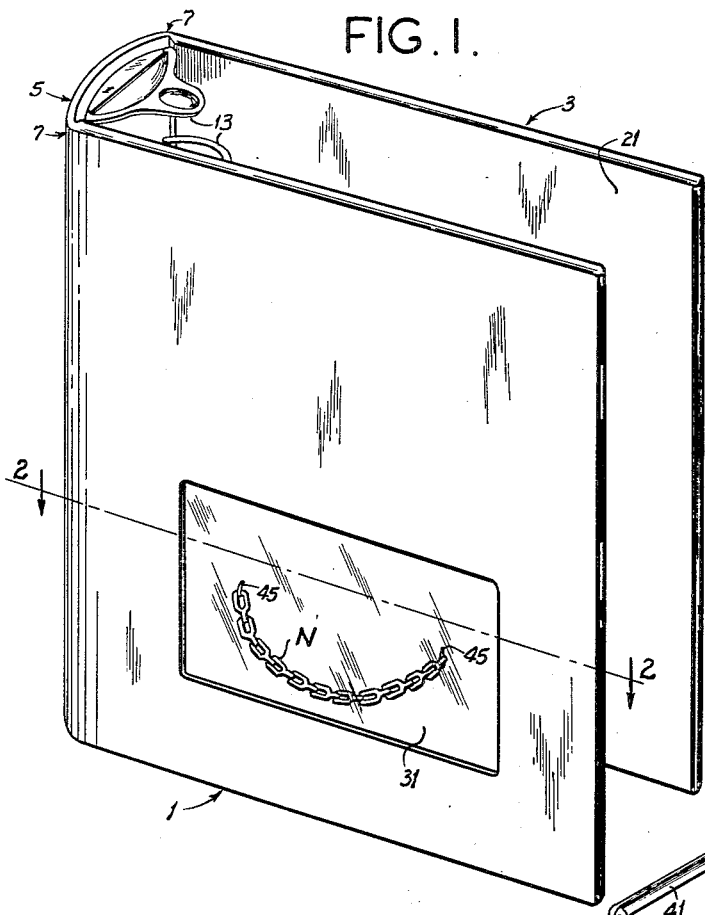
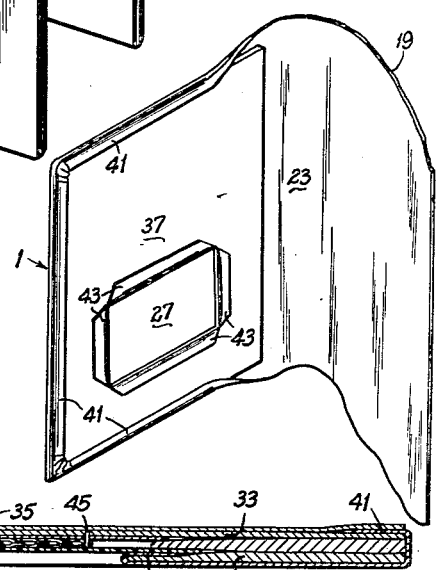
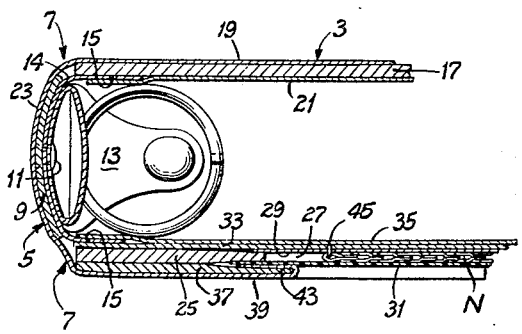
Peter B. Federbush,
Richard N. Federbush
Inventors.
Koenig and Pope
Attorneys.

July 30, 1957 P. B. FEDERBUSH ET AL 2,801,115
DISPLAY PANELS FOR CATALOG BINDERS AND THE LIKE
Filed Dec. 6, 1954 3 Sheets-Sheet 2
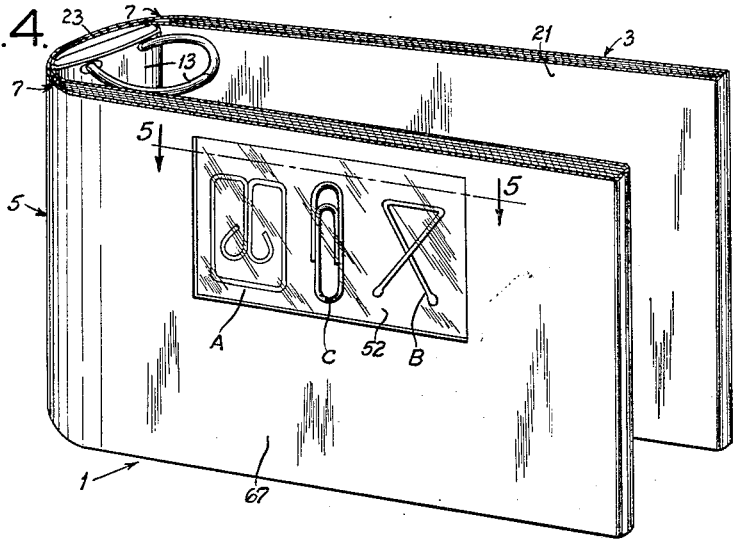
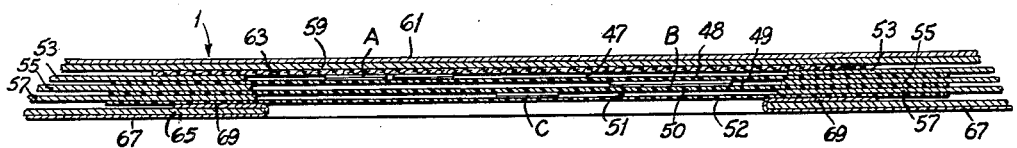
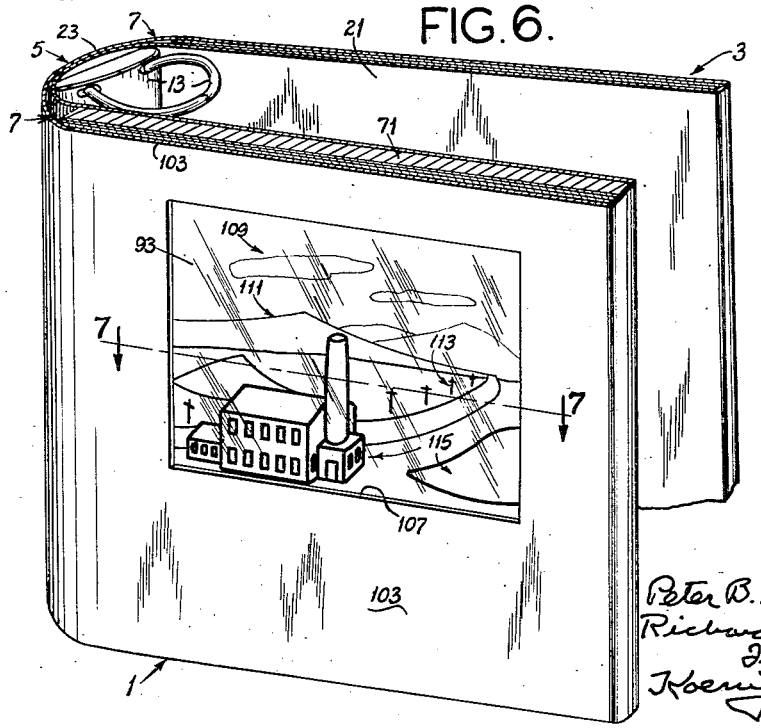

July 30, 1957     P. B. FEDERBUSH ET AL     2,801,115
DISPLAY PANELS FOR CATALOG BINDERS AND THE LIKE
Filed Dec. 6, 1954     3 Sheets-Sheet 3

Peter B. Federbush,
Richard N. Federbush,
Inventors.
Koenig and Pope,
Attorneys.

United States Patent Office 2,801,115
Patented July 30, 1957

2,801,115

DISPLAY PANELS FOR CATALOG BINDERS AND THE LIKE

Peter B. Federbush and Richard N. Federbush, University City, Mo., assignors to Ringmaster, Inc., St. Louis, Mo., a corporation of Missouri Application December 6, 1954, Serial No. 473,427

2 Claims. (Cl. 281—31)

This invention relates to display panels for catalog binders and the like.

Among the several objects of the invention may be noted the provision of a novel panel construction for binders and the like, which provides a compartment in said panel in which a variety of items to which the contents of the binder or catalog relate may be illustrated or protectively displayed, in depth and movably, if desired, thereby forming an interesting display for sales assistance in regard to the binder contents; the provision of a construction of the class described which is compactly arranged within the flat boundaries of the panels without undesirable projections; and the provision of a device of the class described which is simple, strong and economical in construction. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, Fig. 1 is a perspective view of a loose-leaf binder having a front panel construction made according to the invention;

Fig. 2 is an enlarged horizontal section taken on line 2—2 of Fig. 1;

Fig. 3 is a perspective view of certain baseboard and cover parts of Figs. 1 and 2;

Fig. 4 is a fragmentary perspective view of a modified form of the invention;

Fig. 5 is an enlarged horizontal section taken on line 5—5 of Fig. 4;

Fig. 6 is a view similar to Fig. 4, but showing another modification;

Corresponding reference characters indicate corresponding parts throughout the several views of the drawings.

Figure 7:
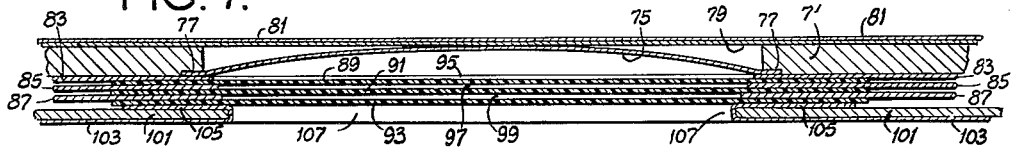
Fig. 7 is an enlarged horizontal section taken on line 7—7 of Fig. 6.
Figure 8:
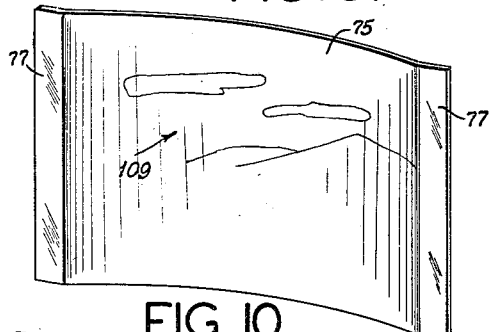
Fig. 8 is a detail perspective view of a background or field member employed in the form of the invention shown in Figs. 6 and 7.
Figure 9:
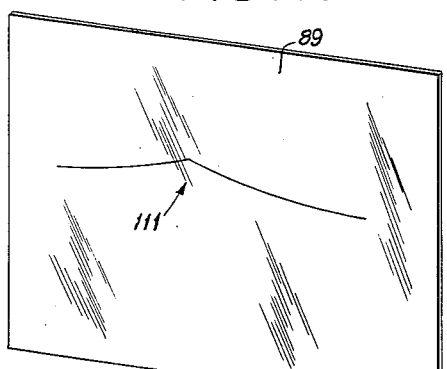
Figs. 9, 10 and 11 are views similar to Fig. 8 but showing certain window overlays used in connection with the background member of Fig. 8; and, Fig. 12 is a fragmentary horizontal section showing a fourth modification of the invention.
Figure 10:
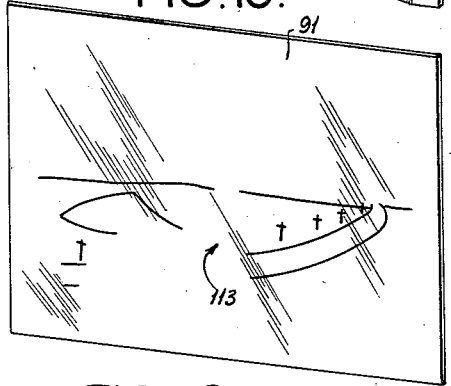
Figure 11:
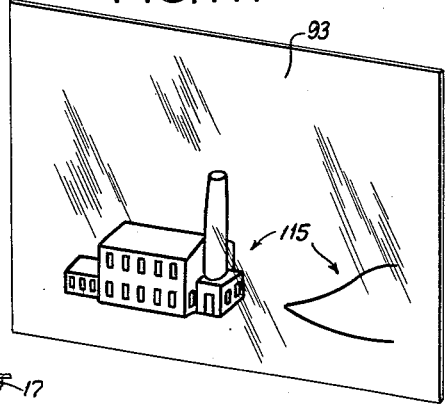

Referring now more particularly to Figs. 1–3, there is shown in general a ring-type, loose-leaf binder embodying the invention. It is to be understood that instead of the binder being of the loose-leaf type it also may be of the permanent type.

Hereinafter when the term "board" is used, it is to be understood that the material constituting it may be cardboard, fiberboard and other equivalents for the purpose. Where the term "sheet" is used, it is to be understood that the material constituting it may be leather, cloth, paper, buckram or the like. If the sheet is referred to as being a transparent or translucent window, it may be composed of cellulose acetate or the like. Wherever the term "transparent" is used herein in connection with a window, it is understood that it means that the window can be seen through, and includes the case of translucence, as, for example, in cases where the impression of atmosphere is desired to be given in connection with a given window. Means referred to in the description or shown in the drawings for joining boards, sheets and windows may be adhesive, paste, or heat-sealed attachments in cases in which heat-sealing plastic sheets are used. These various alternatives will not be further referred to in detail in order to avoid circumlocution.

Referring again to Figs. 1–3, the binder is constituted generally by a front panel 1 and a rear panel 3, joined by a back portion 5 at hinge portions 7. The back 5 may be constituted, for example, by a metal strip 9 to which is riveted as at 11 a ring-type sheet holder 13. Sandwiched between the sheet holder 13 and the back strip 9 is a flexible sheet 14 forming hinge flaps 15.

The rear panel 3 may be the same in all forms of the invention and is constituted by a backboard 17 having an outside cover sheet 19. An inside cover sheet 21 laps the respective hinge portion 15. The outside cover portion 19 has a portion 23 covering the back of the back strip 9. The hinge 7 is formed by the hinge portion 15 and the junction between portions 19 and 23, thus forming a two-layer fabric type of hinge. There are no novel features of the invention in the rear panel 3 and further description will be unnecessary in connection with any form of the invention. The remaining description will be in regard to the construction only of the front panel 1 in each form of the invention. It is to be understood, however, that the front panel construction to be described may be applied to the rear panel if desired.

Referring again to Figs. 1–3, the front panel 1 is composed of a relatively thick frame board 25, thick enough to provide space sufficient in depth for items to be displayed, the framed space being indicated at numeral 27. The space 27, besides the frame board 25 itself, is defined inside by a background field sheet 29, slightly larger than the space 27 and adhered to the inner margins of the frame board 25. This field member may be surface decorated, embossed, colored or otherwise treated to form a decorative background or field. The outside of the space 27 is defined by a transparent (or translucent) window sheet 31, slightly larger than the opening in the frame board 25 and marginally adhered thereto. Back of the frame board 25 and the field sheet 29 is a backboard 33 to which 25 and 29 are adhered. An inner covering sheet 35 is adhered to 25 and 29.

Outside the frame board 25 is located a second thinner frame board 37, which is held in place by an overlying cover sheet 39, formed integrally with the portions 19 and 23 and having edge-lapping adhering portions 41. An opening is cut in the cover sheet 39 and provided with marginal flaps 43 which are turned through the opening in the board 37, as indicated in Fig. 3, where attachment is made to the back of the board 37.

Before application of the window sheet 31, an article to which binder sheets or catalog pages relate, such as, say, a sample chain length N, may be stapled to the backboard 33, as indicated at 45. Thus the article (chain) is supported in the confining space 27, is movable therein, and is covered by the transparent sheet 31 for viewing without snagging or being snagged during use.

In Figs. 4–5 is shown another form of the invention, in which three spaces are provided for displaying in depth several different forms of the cataloged items, for example, three different forms of paper clips A, B, C.

In this case the spaces 47, 49 and 51 for the items A, B, C are provided for by three frame boards 53, 55, 57, respectively. The framed openings in the frame boards 53, 55, 57, respectively providing the spaces 47, 49, 51, are progressively smaller from the inside to the outside of the panel 1. Behind the innermost frame board 53 is a backing board 59, having an inside cover sheet 61. The frame board 53 and the backing board 59 sandwich a field sheet 63 which is larger than the space 47 and adhered marginally to the inner margins of the frame board 53. The field member carries decorative or background material. Window sheets 48, 50 and 52 cover the openings 47, 49 and 51 respectively, being marginally attached to the boards 53, 55 and 57. The articles A, B, C, such as paper clips, may be attached to and between the sheets such as 63, 48, 50 and 52 by adhesive or the like. Overlying the foremost window sheet 57 is an outside frame board 65, having an outer cover sheet 67 attached thereto. The sheet 67 has inturned flaps 69, serving to trim the opening in the board 65, said opening being smaller than any of the successively smaller openings forming spaces 47, 49, 51. From Fig. 4 it will be seen that the result is a protected display of several items in depth within the several planes of the spaces 47, 49 and 51.

In Figs. 6-11 is shown another form of the invention in which an inside frame board 71 is made relatively thick and contains an opening or pocket for accepting a concave field member 75. This concave field member 75 has flat margins 77 for attachment to the lateral inner margins of the frame board 71. On the inside, the frame board 71 is covered by a backboard 79 and a cover sheet 81. On its outside, board 71 is covered by three attached frame boards 83, 85, 87, outside of which are attached window sheets 89, 91 and 93, respectively, covering progressively smaller openings 95, 97, 99, respectively, in these boards 83, 85, 87. A foremost cover board is indicated at 101, on which is a cover sheet 103 having inturned margins 105 forming trim for the foremost and smallest opening 107 in the cover board 101.

From the above it will be seen that the field member 75 (Fig. 8) and the window sheets 89, 91, 93, when assembled, form spaces from inside to outside. On the field member 75 may be shown, for example, a far-background portion 109 only of some scene (Fig. 8); on the innermost window 89 may be another background component 111 of the same scene (Fig. 9); on the window sheet 91 may be the middle ground component 113; and on the foremost window sheet 93 may be the foreground component 115. These components may be applied by any suitable process, such as silk screen printing or the like. The result is a front panel 1 containing a scene in depth with a diorama type of background which as an ensemble attracts considerable attention, having a stereoscopic appearance.

Figure 12:
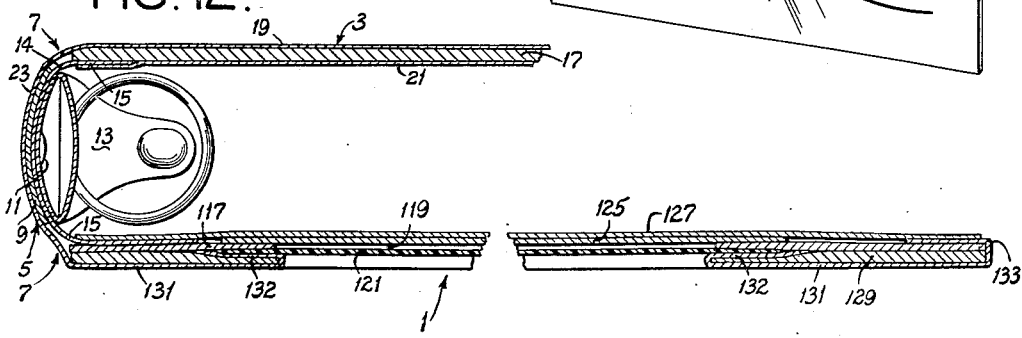

In Fig. 12 is shown another form of the invention, in which the front panel 1 is constituted by a frame board 117, the framed opening 119 of which is outwardly covered by an overlapping window sheet 121. Backing up the opening 119 in the frame board 117 is a field member 125 which is larger than said opening, the margins of which are attached behind the inner margins of the board 117. An attached backing sheet is shown at 127. At 129 is shown a forward frame board on which is a cover sheet 131 having overlaps 132 around the inner margins of the frame board 129 and also having an outer marginal overlap 133.

Among the advantages of the invention is a structure which provides a field member behind one or more spaces covered by one or more window panels suitable, if desired, for carrying objects in the space or spaces and scenes or other indicia on the window panels and on the rear field member. From what has been said it will be clear that there may be combined with components of scenes shown on the spaced window panels additional actual articles located in the spaces between them. Thus, for example, articles such as B and C in Fig. 4 might be carried in the spaces 97 and 99 in Fig. 7. Another advantage of the structures described is their flat, smooth exterior surfaces having no bulky protrusions that might interfere with stacking or vertical shelving of the binders.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. A binder construction comprising front and rear panels, a back strip, an integral outer hinge-forming sheet attached to and exteriorly covering said panels and strip, a second and inner hinge-forming sheet joining said panels and the back strip, said front panel comprising an inner frame member having a first opening therein, a back field sheet larger than said first opening and attached marginally thereto, a backing sheet covering said inner frame and the field sheet, a window sheet larger than said first opening and attached marginally and outwardly thereover to form with said backing sheet a space, an outward frame member having a second opening therein exposing said window and field sheets, said outer hinge-forming sheet having a third opening therein coextensive with said second opening, said outer hinge-forming sheet having integral flaps around the margins of the third opening and folded therearound, whereby said flaps lie between the outward frame member and said window sheet and trim said third opening.

2. A binder construction comprising front and rear panels, a back strip, an integral outer hinge-forming sheet attached to and exteriorly covering said panels and strip, a second and inner hinge-forming sheet joining said panels and the back strip, said front panel including several flat inner frame members respectively having therein members of a first group of openings, a back field sheet larger than any of said group of openings and attached marginally to the innermost one of said inner frame members, a backing sheet covering the field sheet and said innermost one of said inner frame members, window sheets marginally sandwiched between said inner frame members and larger than said group of openings respectively whereby spaces are formed, an outer frame member having a second opening therein exposing said window and field sheets, said outer hinge-forming sheet having a third opening therein coextensive with said second opening, said outer hinge-forming sheet having integral flaps around the margins of the third opening and folded therearound, whereby said flaps lie between the outward frame member and the outermost one of said window sheets and trim said third opening.

References Cited in the file of this patent

UNITED STATES PATENTS

| | | |
|---|---|---|
| 1,467,680 | Oda | Sept. 11, 1923 |
| 1,599,779 | Michlinski | Sept. 14, 1926 |
| 2,088,953 | Greer | Aug. 3, 1937 |
| 2,150,474 | Williams | Mar. 14, 1939 |
| 2,577,320 | Fenyo | Dec. 4, 1951 |